United States Patent
Cox (10) Patent No.: US 11,351,834 B2
(45) Date of Patent: *Jun. 7, 2022

(54) METHODS AND APPARATUS FOR ADJUSTING A SPRING PRE-LOAD

(71) Applicant: Fox Factory, Inc., Duluth, GA (US)

(72) Inventor: Christopher Paul Cox, Capitola, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,794

(22) Filed: Jun. 20, 2019

(65) Prior Publication Data

US 2019/0308483 A1 Oct. 10, 2019

Related U.S. Application Data

(60) Division of application No. 15/684,343, filed on Aug. 23, 2017, now abandoned, which is a continuation of application No. 14/291,518, filed on May 30, 2014, now Pat. No. 9,744,826.

(60) Provisional application No. 61/829,929, filed on May 31, 2013.

(51) Int. Cl.
*F16F 1/12* (2006.01)
*B60G 17/02* (2006.01)
*B25B 13/08* (2006.01)
*B25B 13/48* (2006.01)
*B60G 15/06* (2006.01)
*F16B 23/00* (2006.01)

(52) U.S. Cl.
CPC ............ *B60G 17/021* (2013.01); *B25B 13/08* (2013.01); *B25B 13/48* (2013.01); *B60G 15/063* (2013.01); *F16B 23/0076* (2013.01); *F16F 1/121* (2013.01); *B60G 2202/12* (2013.01); *B60G 2204/1242* (2013.01)

(58) Field of Classification Search
CPC .......... B60G 17/021; B60G 2204/1242; B60G 15/063; B60G 2202/12; F16F 1/121; F16F 1/041; F16F 9/56
USPC ........................................................ 267/177
See application file for complete search history.

(56) References Cited

U.S. PATENT DOCUMENTS

| | | | | |
|---|---|---|---|---|
| 178,084 A | * | 5/1876 | Skinner | B25B 13/48 81/176.3 |
| 489,429 A | * | 1/1893 | Brigger | B25B 13/48 81/176.1 |
| 1,752,074 A | * | 3/1930 | Gagne | B25B 13/02 81/176.1 |
| 2,713,803 A | * | 7/1955 | Schwaiger | B25B 13/28 81/383 |
| 3,618,927 A | * | 11/1971 | Nicholls | F16F 9/38 267/48 |

(Continued)

*Primary Examiner* — Xuan Lan Nguyen (57) ABSTRACT

A wrench and nut combination, including: a wrench lug including: a wrench lug feature that substantially mates with a nut feature of a nut of a shock absorber during a first rotation of said nut, relative to external body threads on a body of the shock absorber, in a first direction, wherein the wrench lug feature and the nut feature release during a second rotation of said nut, relative to the external body threads, in a second direction, wherein at least one of the first rotation and the second rotation causes an adjustment to a compressive coil spring pre-load of a set of coil springs disposed in the shock absorber.

10 Claims, 5 Drawing Sheets

(56) References Cited

U.S. PATENT DOCUMENTS

| | | | |
|---|---|---|---|
| 3,877,687 A * | 4/1975 | Sarti | B60G 15/02 267/195 |
| 4,063,472 A * | 12/1977 | MacIntyre | B25B 13/463 81/176.1 |
| 7,451,338 B2 | 11/2008 | Lemos et al. | |
| 7,538,772 B1 | 5/2009 | Fouladi et al. | |
| 9,744,826 B2 * | 8/2017 | Cox | F16F 1/121 |
| 2001/0027705 A1 * | 10/2001 | Hsieh | B25B 27/18 81/119 |
| 2002/0038929 A1 * | 4/2002 | Now | B60G 15/065 267/217 |
| 2004/0199630 A1 | 10/2004 | Sarkissian et al. | |
| 2005/0141510 A1 | 6/2005 | Narsinh et al. | |
| 2007/0079167 A1 | 4/2007 | Lemos et al. | |
| 2010/0107023 A1 | 4/2010 | Guettaf et al. | |
| 2010/0205293 A1 | 8/2010 | Hu et al. | |
| 2010/0222135 A1 | 9/2010 | Sylla et al. | |
| 2013/0003555 A1 | 1/2013 | Moran et al. | |
| 2013/0086248 A1 | 4/2013 | Campbell et al. | |
| 2017/0349025 A1 | 12/2017 | Cox | |

* cited by examiner

METHODS AND APPARATUS FOR ADJUSTING A SPRING PRE-LOAD

CROSS-REFERENCE TO RELATED APPLICATIONS

This patent application is a divisional of and claims priority to United States U.S. patent application Ser. No. 15/684,343, filed Aug. 23, 2017, entitled, "METHODS AND APPARATUS FOR ADJUSTING A SPRING PRE-LOAD", by Christopher Paul Cox, assigned to the assignee of the present application, which is incorporated herein in its entirety by reference thereto.

The patent application Ser. No. 15/684,343 is a continuation of and claims priority to United States U.S. patent application Ser. No. 14/291,518, filed May 30, 2014, now U.S. Issued U.S. Pat. No. 9,744,826, entitled, "METHODS AND APPARATUS FOR ADJUSTING A SPRING PRE-LOAD", by Christopher Paul Cox, assigned to the assignee of the present application, which is incorporated herein in its entirety by reference thereto.

The patent application Ser. No. 14/291,518 claims priority to and benefit of U.S. provisional patent application 61/829,929, filed May 31, 2013, entitled, "METHODS AND APPARATUS FOR ADJUSTING A SPRING PRE-LOAD", by Paul Cox, assigned to the assignee of the present application, which is incorporated herein in its entirety by reference thereto.

BACKGROUND

Field of the Invention

Embodiments of the invention generally relate to methods and apparatus for use in suspension components. Particular embodiments of the invention relate to methods and apparatus useful for adjusting the pre-load in a shock absorber spring.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale, except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Overview of Discussion

Embodiments provide a shock absorber for adjusting a spring pre-load therein. More particularly, the embodiments disclosed herein include a wrench for engaging with a nut of a shock absorber, wherein the wrench/nut combination has features which positively retain the wrench in an engagement with the nut during a rotation of the nut, while also allowing for a "ratcheting" between the wrench and the nut during wrench repositioning. The rotation of the nut results in the adjustment of the spring pre-load, thereby increasing or decreasing the compressive pre-load on the shock absorber's spring(s).

The discussion begins with a description of a shock absorber, including a nut, in accordance with an embodiment. See FIGS. 1A, 1B, 2A and 2B. Following, a wrench and shock absorber nut combination is described, in accordance with an embodiment. See FIGS. 3A, 3B, 3C, 4, 5A, 5B, 5C, 5D and 5E.

Example Shock Absorber for Adjusting a Spring Pre-Load

Figure 1A:
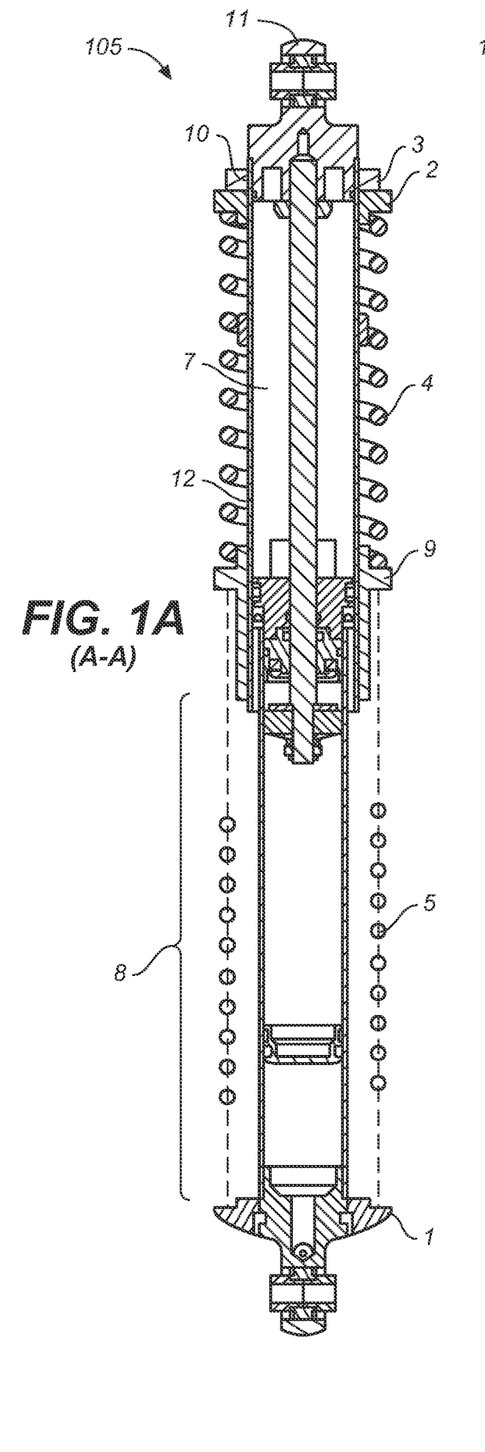
FIG. 1A is a side cross-sectional view of section A-A of a shock absorber, in accordance with an embodiment.
Figure 1B:
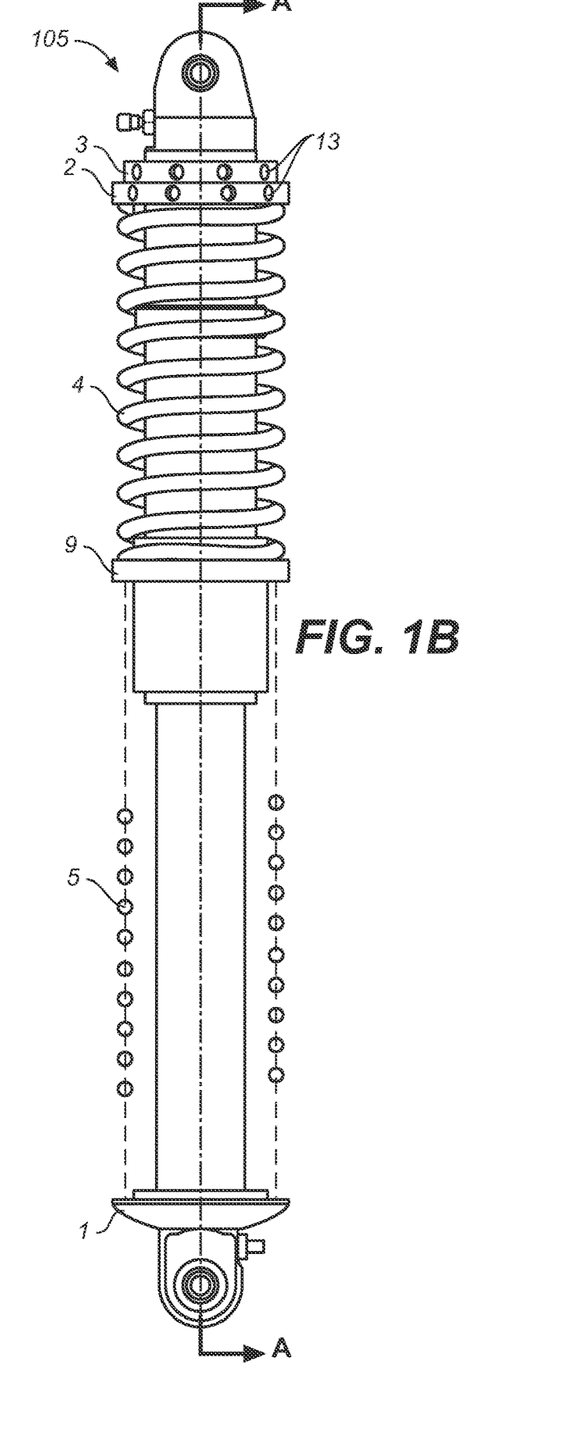
FIG. 1B is a side perspective view of the section A-A of FIG. 1A, in accordance with an embodiment.

FIG. 1A shows a side cross-sectional view of section A-A of a shock absorber, in accordance with an embodiment. FIG. 1B shows a side perspective view of the section A-A of FIG. 1A, in accordance with an embodiment. With reference now to FIG. 1A, a shock absorber 105 is shown for a vehicle, in accordance with an embodiment. In one embodiment, the shock absorber 105 includes an adjustable coil spring, such as the coil spring 4 and coil spring 5, an air spring 7 and a damper 8. It should be noted that embodiments may provide only one coil spring, such as that coil spring 6 shown on shock absorber 200 of FIGS. 2A and 2B, as will be described herein.

Referring again to FIGS. 1A and 1B, the shock absorber 105 includes coil springs 4 and 5, which are disposed in the shock absorber 105 serially, that is, coil springs 4 and 5 are disposed in the shock absorber 105 in line with each other. The coil springs 4 and 5 operate together through the floating sleeve 9. The spring rate of the coil spring 4 may differ from the spring rate of the coil spring 5 to allow for an overall compound spring rate for the embodiment shown in FIGS. 1A and 1B. Further, the embodiments shown in FIGS. 1A and 1B include adjustable preloaded coil springs.

In one embodiment, as shown in FIGS. 1A and 1B, the coil spring pre-load is adjusted by rotating nut 2 relative to the external body threads 10. For example, if the external body threads 10 are right hand threads, then the rotation of nut 2 (as viewed from the end of the eyelet 11) in a clockwise direction will increase the axial (compressive) pre-load on the spring 4 and, correspondingly, also on the spring 5, as the pre-load is transferred via the axially (and rotationally) floating sleeve 9. Conversely, the rotation of the nut 2 in a counterclockwise direction will decrease the axial (compressive) pre-load on the springs 4 and 5. Once the desired pre-load is achieved, the nut 2 is retained in this rotational (and hence axial) position relative to the body 12 by the lock nut 3, which is tightened down against the nut 2 while holding the nut 2 rotationally stationary.

Figure 2A:
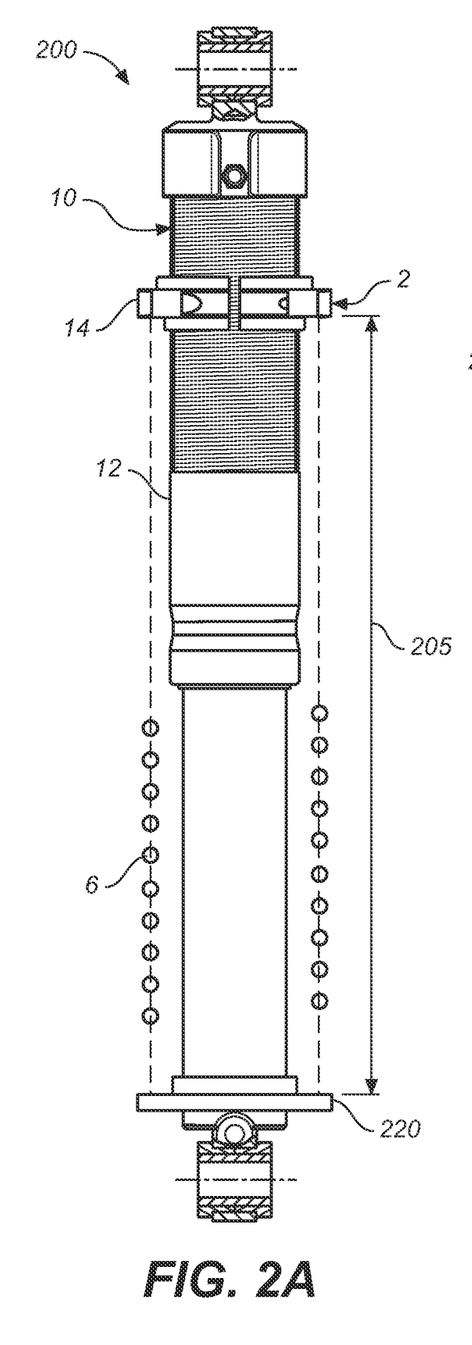
FIG. 2A is a side perspective view of a shock absorber, in accordance with an embodiment.
Figure 2B:
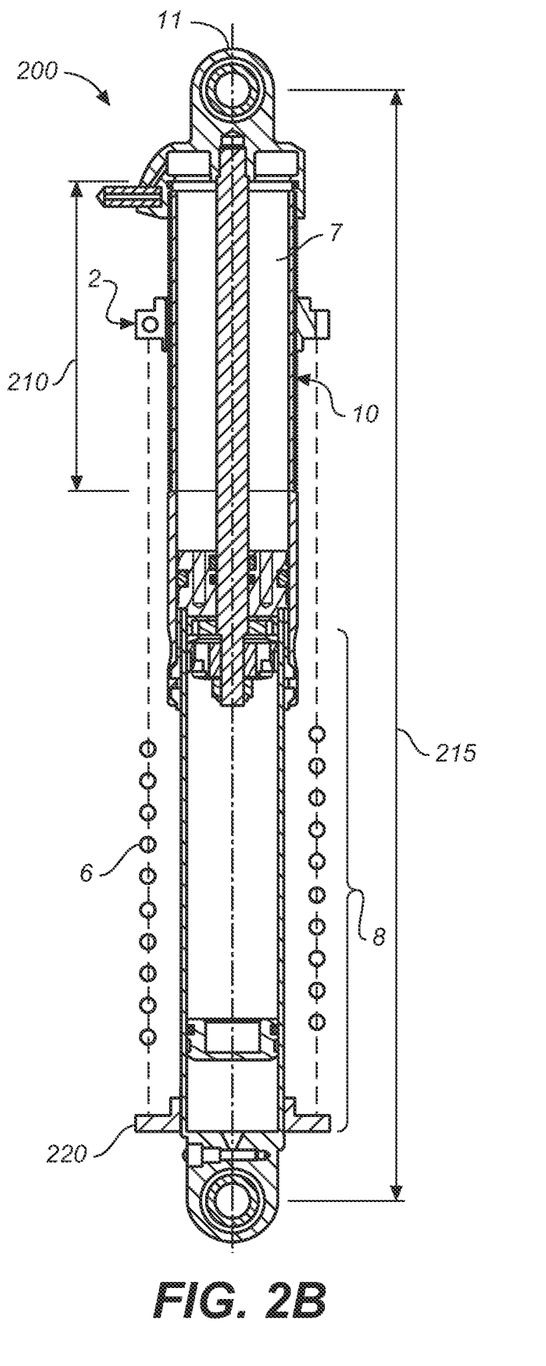
FIG. 2B is a side cross-sectional view of the shock absorber of FIG. 2A, in accordance with an embodiment.

FIG. 2A shows a side perspective view of a shock absorber, in accordance with an embodiment. FIG. 2B shows a side cross-sectional view of the shock absorber of FIG. 2A, in accordance with an embodiment. With reference now to FIGS. 2A and 2B, the shock absorber 200 includes a single coil spring 6. The single coil spring 6 is an adjustable preloaded coil spring, in one embodiment. In one embodiment, the coil spring pre-load is adjusted by rotating the nut 2 relative to the external body threads 10. For example, if the external body threads 10 are right hand threads, then the rotation of the nut 2 (as viewed from the end of the eyelet 11) in a clockwise direction will increase the axial (compressive) pre-load on the spring 6. Conversely, the rotation of the nut 2 in a counterclockwise direction will decrease the preload on the spring 6.

With reference to embodiments shown in FIGS. 1A, 1B, 2A and 2B, the adjustment nuts, such as, for example, the nut 2 (and the lock nut 3) may include plain wrench flats, radial holes (e.g., as radial holes 13), radial notches 14 (shown in FIGS. 2A and 2B) or certain other rotation direction "neutral" features for engaging with a wrench (e.g., wrench 15 of FIGS. 3A, 3B, 3C, 4 and 5, as will be described herein) or lever apparatus during rotation (particularly during tightening, which increases a spring compressive pre-load).

It should be appreciated that embodiment provide for shock absorbers that include a set of coiled springs, wherein the set of coil springs may be one or more coil springs—coil spring 6 or coil springs 4 and 5. Additionally, noted within FIGS. 2A and 2B is the length 205 of the preload, the thread length 210, and the extended length 215 of the shock absorber 200. Further noted is the spring retainer and retaining ring 220, shown for reference.

Figure 3A:
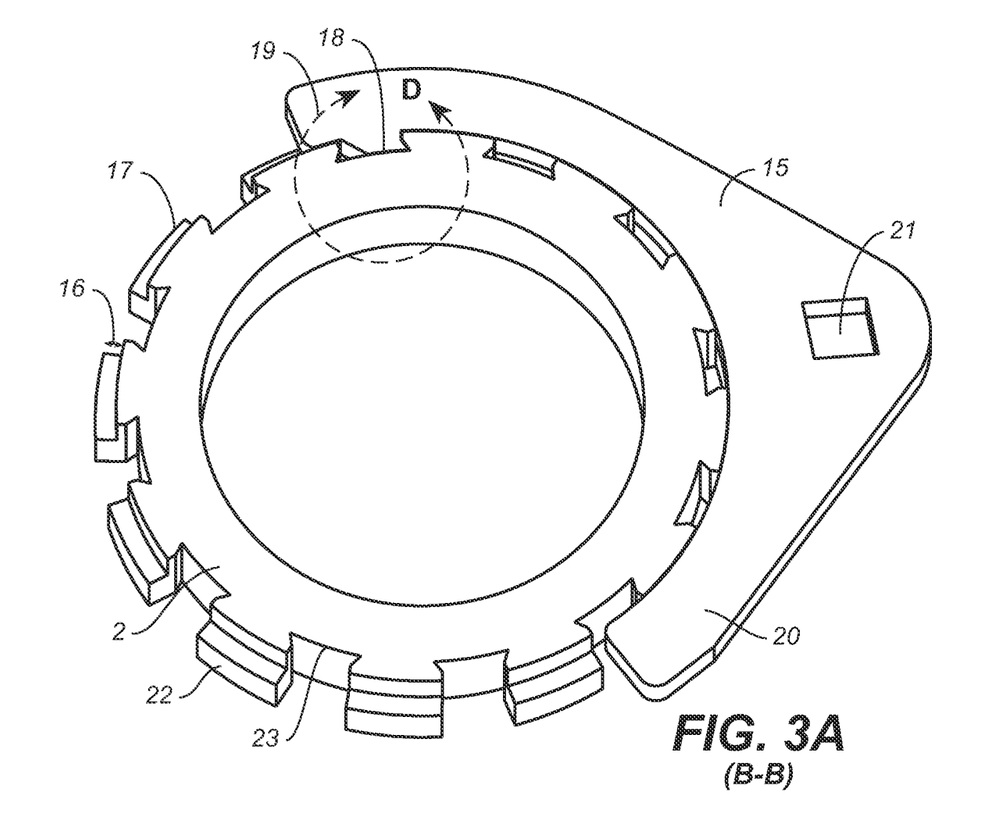
FIG. 3A is a perspective view of a wrench engaged with a nut at section B-B, shown from an angled top view, in accordance with an embodiment.
Figure 3B:
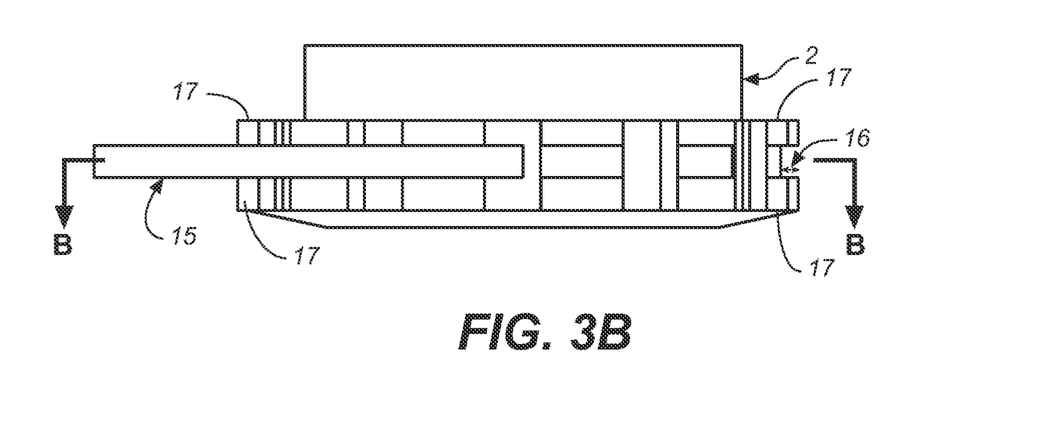
FIG. 3B is a side perspective view of section B-B, in accordance with an embodiment.
Figure 3C:
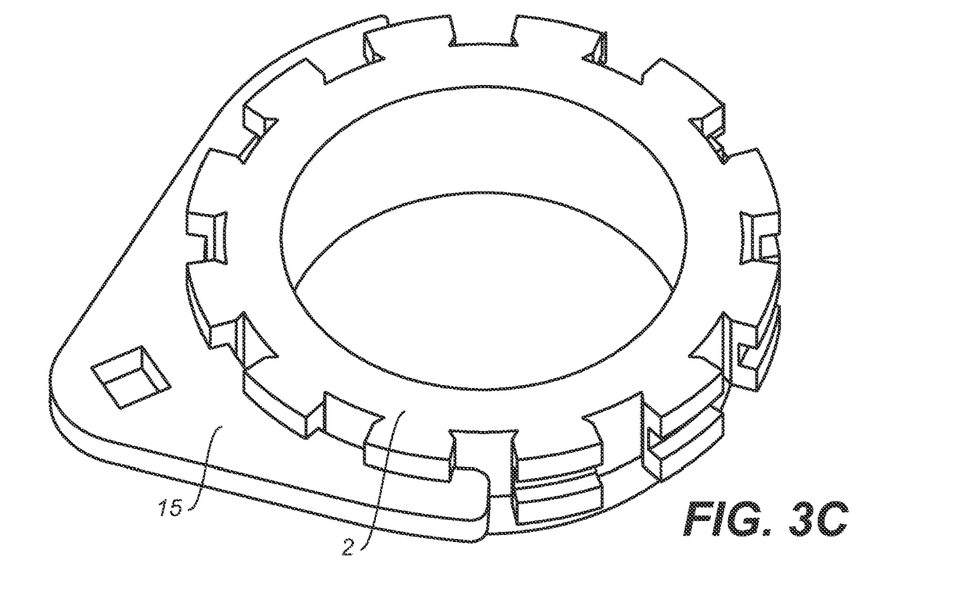
FIG. 3C is a perspective view of a wrench engaged with a nut, shown from an angled top view, in accordance with an embodiment.

FIG. 3A is a perspective view of a wrench engaged with a nut at section B-B, shown from an angled top view, in accordance with an embodiment. FIG. 3B is a side perspective view of section B-B, in accordance with an embodiment. FIG. 3C is perspective view of a wrench engaged with a nut, shown from an angled top view, in accordance with an embodiment. With reference now to FIGS. 3A-3C, a wrench 15 is engaged with the nut 2 and a section B-B of the same. The nut 2 includes the slot 16 within the axial wrench retainer lugs 17 (where the axial wrench retainer lugs 17 are circumferentially distributed about the nut 2 at regular intervals). The axial wrench retainer lugs 17 restrict axial movement of the wrench 15 relative to the nut 2 when either or both of the wrench leading end 19 or the wrench trailing end 20 are engaged in the slot 16. In that way, the wrench 15 remains operatively positioned relative to the nut 2 during "ratcheting" (repositioning following a tightening or loosening stroke) of the wrench 15. In one embodiment, the wrench 15 may be rotated by placing a standard square drive socket wrench arm into the corresponding drive profile 21. Of note and as indicated, the wrench 15 is retained within the slot 16. A standard square drive socket wrench arm may be inserted into the corresponding drive profile, such as the drive profile 21, without having to directly touch the nut 2. This is beneficial in situations in which the shock absorber is positioned on a vehicle (e.g., a motorcycle) in a relatively inaccessible location. The wrench 15 provides an extension to the nut 2, according to embodiments, thus extending a user's ability to adjust the shock absorber's compressive spring pre-load without having to disassemble portions of the vehicle.

The nut 2 is rotationally urged by the wrench 15 via a substantially mating engagement between the wrench lug 18 and the nut profiles formed by, for example, the nut slot 23 and the nut lug 22 (hereinafter, "profile 22/23", unless specifically noted otherwise). The term, "substantially" is meant to describe the mating engagement to occur to such an extent as to enable the nut 2 to be rotationally urged by the wrench 15.

Figure 4:
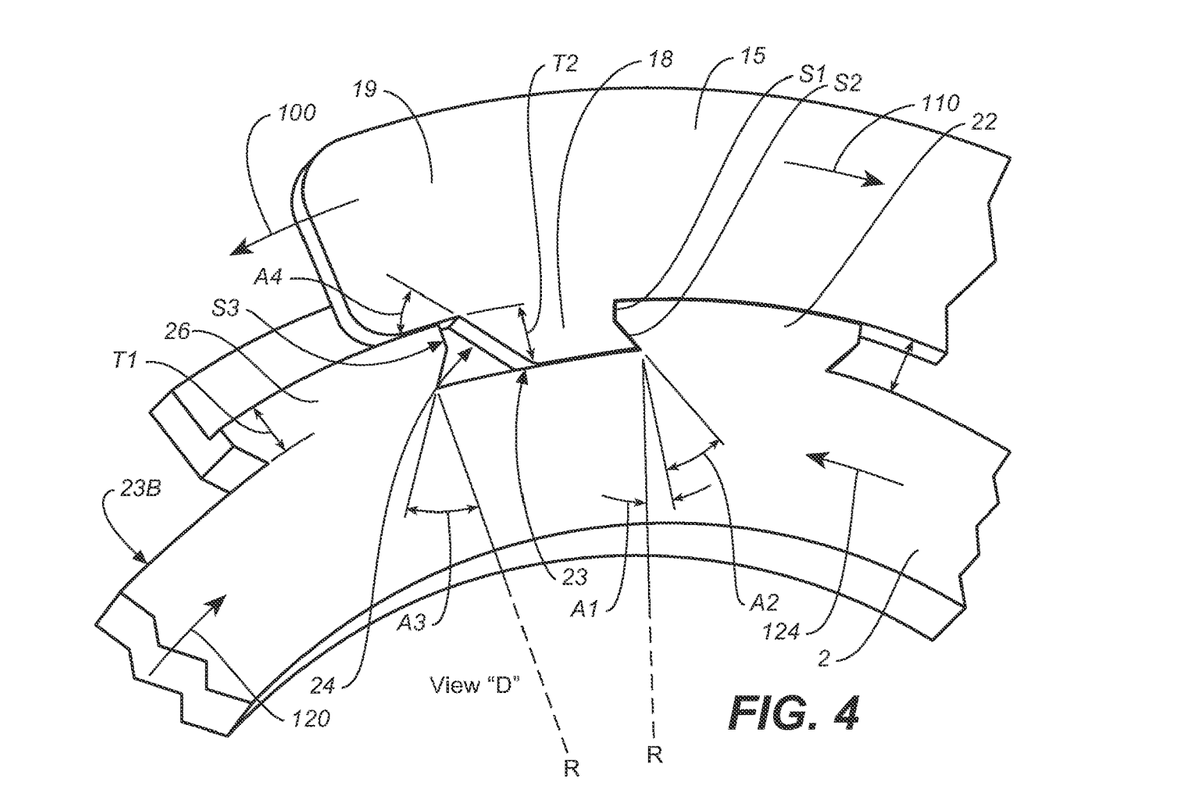
FIG. 4 is a perspective view of the detail D of FIG. 3A, shown from an angled top view, in accordance with an embodiment.

FIG. 4 shows a perspective view of the detail D of FIG. 3A. In one embodiment, the profile 22/23 is described as a "dovetail" slot and the wrench lug 18 is described as a male half "dovetail" engagement lug. In one embodiment, the wrench lug 18 is described as a "ratchet paw". As shown, the leading end 19 of the wrench 15 is engaged with a portion of the nut 2 via the wrench lug 18 (as engaged with the profile 22/23). When the wrench 15 is rotated in the first direction 110, the surfaces S1 and S2 of the wrench lug 18 bear upon the engaged nut surfaces of the projection of the nut lug 22, and thereby urge the nut 2 to rotate in the direction 120. Since the combination of the angle A1 and the angle A2 are more toward the direction of the rotation 110/120 than a radius R of the nut 2, a force imparted against the wrench lug 18 (primarily the surface S2) includes a component that is radially toward the center of the nut 2 and therefore tends to pull the wrench lug 18 in tightly against the surface 23 of the nut 2. As a practical matter, that causes the wrench 15 to "grip" the nut 2 more tightly with increased rotational torque (in the 110 direction).

When the wrench 15 is repositioned relative to the nut 2, it is rotated in the direction 100 while the nut 2 remains stationary. Such rotation of the wrench 15 causes the leading edge 24 of the wrench lug 18 to bear upon the corner of the surface S3. Due to the angle A4 of the leading edge 24, there is a force component generated by such bearing upon the surface A3 against the wrench lug 18 and the leading end 19 of the wrench lug 18 in a radially outward direction (relative to the center of the nut 2). This outward component causes the wrench 15/leading end 19 of the wrench lug 18 to engage the profile 23B. When the next desired profile 23B is reached by the rotation in the direction 100 of the wrench 15, a return to the direction 110 of the rotation of the wrench 15 will cause the wrench lug 18 to engage the profile 23B and another rotation cycle of the nut 2 may begin.

In one embodiment, the height T1 of the profile 22/23 is slightly greater than the height T2 of the wrench lug 18.

It should be appreciated that the nut 2 operates as an axially movable spring retainer. The nut 2 is movable and retains the springs 4 and 5 or 6. As described herein, the nut 2 has a profile 22/23, whereas the wrench 15 has a profile that includes the shape of the wrench lug 18. The profile of the wrench 15 engages with the profile 22/23 of the nut 2 to cause a rotation of the nut 2 in a direction that either causes a compressive pre-load of the spring(s) or releases the retention force generated by the nut 2 that may have been in a tightened position/state.

It should also be appreciated that the wrench 15 may be physically reversed such that the leading end 19 faces in the first direction 110, instead of the direction 100 that it faces in FIG. 4. When the wrench 15 is reversed, the surfaces S1 and S2 of the wrench lug 18 bear upon the engaged nut surfaces of the projection of the nut lug 26, and thereby urge the nut 2 to rotate in the direction 124, thereby causing either a release of the retention force generated by the nut 2 or a compressive pre-load of the spring(s).

Figure 5A:
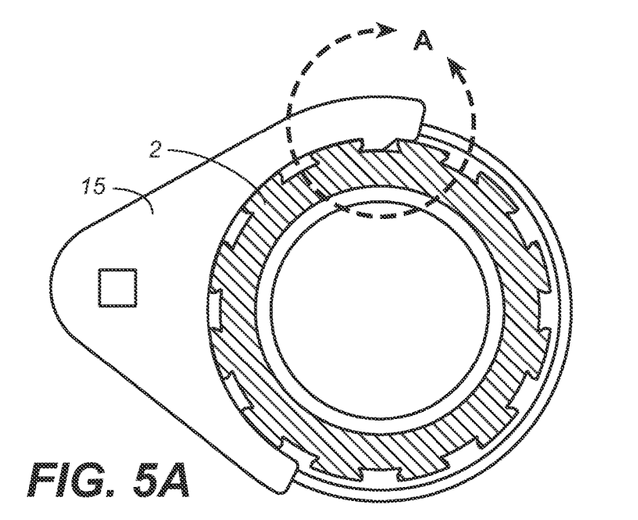
FIG. 5A is a top perspective view of a wrench engaged with a nut, in accordance with an embodiment.
Figure 5B:
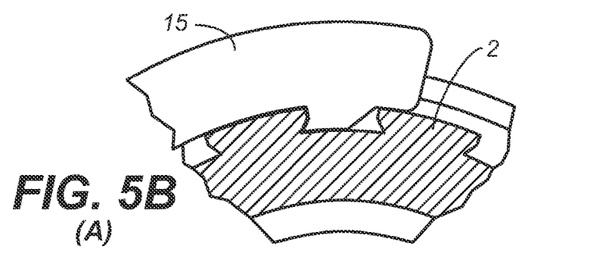
FIG. 5B is a top perspective view of the detail A of FIG. 5A, in accordance with an embodiment.
Figure 5C:
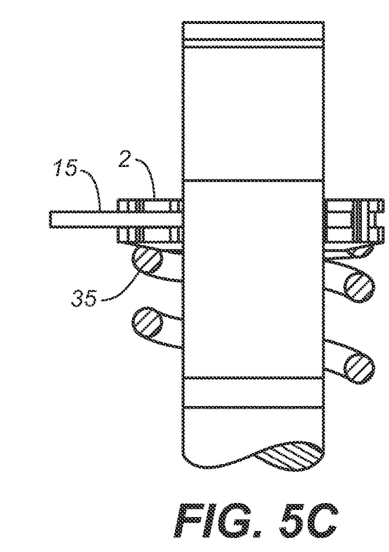
FIG. 5C is a side cross-sectional view of a wrench engaged with a nut, in accordance with an embodiment.
Figure 5D:
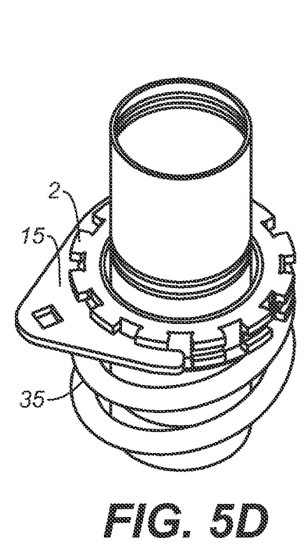
FIG. 5D is a perspective view of a wrench engaged with a nut, shown from an angled side view, in accordance with an embodiment.
Figure 5E:
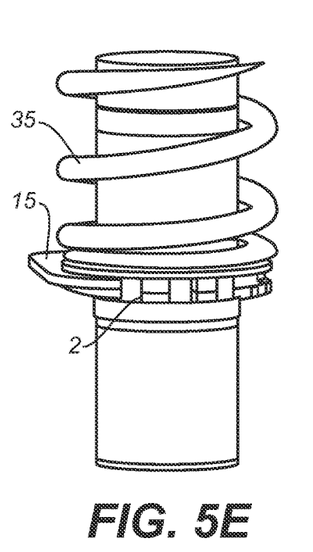
FIG. 5E is a side perspective view of a wrench engaged with a nut, in accordance with an embodiment.

FIGS. 5A-5E show various perspectives of the wrench 15 relative to the nut 2 and the coil springs 4 and 5 or 6. More particularly, FIG. 5A shows a top perspective view of the wrench 15 engaged with the nut 2, in accordance with embodiments. FIG. 5B shows a top perspective view of the detail A of FIG. 5A, in accordance with an embodiment. FIG. 5C shows a side cross-sectional view of the wrench 15 engaged with the nut 2 relative to the coil spring 35 (coil spring 35 represents coil spring 4 and 5 or 6), in accordance with an embodiment. FIG. 5D shows a perspective view of the wrench 15 engaged with the nut 2 relative to the coil spring 35 (coil spring 35 represents coil spring 4 and 5 or 6), from an angled side view, in accordance with an embodiment. FIG. 5E shows a perspective view of the wrench 15 engaged with the nut 2, relative to the coil spring 35 (coil spring 35 represents coil spring 4 and 5 or 6), in accordance with an embodiment.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

What I claim is:

1. A shock absorber comprising:
    a shock absorber body;
    a mechanical spring coupled to said shock absorber body; and
    an axially movable spring retainer coupled to said shock absorber body and said mechanical spring, said axially movable spring retainer configured to adjust an axial position of said mechanical spring with respect to said shock absorber body, said axially movable spring retainer comprising:
        an outer diameter surface; and
        a plurality of notches formed into said outer diameter surface, said plurality of notches configured to engage with a lever apparatus to enable rotation of said axially movable spring retainer with respect to said shock absorber body, said rotation of said axially movable spring retainer adjusting a pre-load on said a mechanical spring, wherein said plurality of notches are distributed about said outer diameter surface of said axially movable spring retainer at regular intervals, said plurality of notches having a shape configured to receive respective lugs of said lever apparatus, said plurality of notches further configured such that, when said respective lugs of said lever apparatus engage said plurality of notches, axial movement of said lever apparatus is prevented, said plurality of notches and said respective lugs of said lever apparatus further configured such that said lever apparatus remains positioned relative to said axially movable spring retainer during a repositioning following a tightening or a loosening stroke of said lever apparatus.

2. The shock absorber of claim 1, further comprising:
    an axially movable spring retainer lock coupled to said shock absorber body, said axially movable spring retainer lock configured for being axially moved proximate to said axially movable spring retainer to generate a retention force with respect to said axially movable spring retainer, such that said axially movable spring retainer is retained at a position wherein said retention force is generated.

3. The shock absorber of claim 1, wherein said mechanical spring comprises:
    a first mechanical spring of two mechanical springs serially coupled to said shock absorber; and
    a floating sleeve configured for transferring a pre-load from said first mechanical spring to a second mechanical spring of said two mechanical springs.

4. A shock absorber comprising:
    a shock absorber body, said shock absorber body having external threads disposed thereon;
    a mechanical spring coupled to said shock absorber body; and
    an axially movable spring retainer coupled to said shock absorber body and said mechanical spring, said axially movable spring retainer configured to adjust an axial position of said mechanical spring with respect to said shock absorber body, said axially movable spring retainer comprising:
        an outer diameter surface; and
        a plurality of notches formed into said outer diameter surface, said plurality of notches configured to engage with a lever apparatus to enable rotation of said axially movable spring retainer with respect to said shock absorber body, said rotation of said axially movable spring retainer, in a first direction relative to said external threads increases a pre-load on said mechanical spring, and said rotation of said axially movable spring retainer, in a second direction relative to said external threads decreases a pre-load on said mechanical spring, said plurality of notches having a shape configured to receive respective lugs of a lever apparatus, said plurality of notches further configured such that, when said respective lugs of said lever apparatus engage said plurality of notches, axial movement of said lever apparatus is prevented, said plurality of notches and said respective lugs of said lever apparatus further configured such that said lever apparatus remains positioned relative to said axially movable spring retainer during a repositioning following a tightening or a loosening stroke of said lever apparatus.

5. The shock absorber of claim 4, further comprising:
    an axially movable spring retainer lock coupled to said shock absorber body, said axially movable spring retainer lock configured for being axially moved proximate to said axially movable spring retainer to generate a retention force with respect to said axially movable spring retainer, such that said axially movable spring retainer is retained at a position wherein said retention force is generated.

6. The shock absorber of claim 4, wherein said mechanical spring comprises:
    a first mechanical spring of two mechanical springs serially coupled to said shock absorber; and a floating sleeve configured for transferring a pre-load from said first mechanical spring to a second mechanical spring of said two mechanical springs.

7. The shock absorber of claim 4, wherein said plurality of notches are distributed about said outer diameter surface of said axially movable spring retainer at regular intervals.

8. A shock absorber comprising:
a shock absorber body;
external threads disposed on said shock absorber body;
a mechanical spring coupled to said shock absorber body, wherein said mechanical spring comprises:
   a first mechanical spring of two mechanical springs serially coupled to said shock absorber; and
   a floating sleeve configured for transferring a pre-load from said first mechanical spring to a second mechanical spring of said two mechanical springs;
an axially movable spring retainer coupled to said shock absorber body and said mechanical spring, said axially movable spring retainer configured to adjust an axial position of said mechanical spring with respect to said shock absorber body, said axially movable spring retainer comprising:
   an outer diameter surface; and
   a plurality of notches formed into said outer diameter surface, said plurality of notches configured to engage with a lever apparatus to enable rotation of said axially movable spring retainer with respect to said shock absorber body, said rotation of said axially movable spring retainer adjusting a pre-load on said a mechanical spring; and an axially movable spring retainer lock coupled to said shock absorber body, said axially movable spring retainer lock configured for being axially moved proximate to said axially movable spring retainer to generate a retention force with respect to said axially movable spring retainer, such that said axially movable spring retainer is retained at a position wherein said retention force is generated, said plurality of notches having a shape configured to receive respective lugs of said lever apparatus, said plurality of notches further configured such that, when said respective lugs of said lever apparatus engage said plurality of notches, axial movement of said lever apparatus is prevented, said plurality of notches and said respective lugs of said lever apparatus further configured such that said lever apparatus remains positioned relative to said axially movable spring retainer during a repositioning following a tightening or a loosening stroke of said lever apparatus.

9. The shock absorber of claim 8, wherein said plurality of notches are distributed about said outer diameter surface of said axially movable spring retainer at regular intervals.

10. The shock absorber of claim 8, wherein said rotation of said axially movable spring retainer, in a first direction relative to said external threads, increases said pre-load on said mechanical spring, and said rotation of said axially movable spring retainer, in a second direction relative to said external threads, decreases said pre-load on said mechanical spring.

* * * * *